United States Patent

Berler

[15] 3,685,723

[45] Aug. 22, 1972

[54] PHOTOELECTRIC MANUAL READER FOR PRINTED CODED TAGS

[72] Inventor: Robert M. Berler, 3 Bruce Lane, Westport, Conn. 06880

[22] Filed: May 21, 1971

[21] Appl. No.: 145,698

[52] U.S. Cl. ....................235/61.11 E
[51] Int. Cl. ....................G06k 7/10
[58] Field of Search.235/61.11 E; 250/219 R, 219 Q, 250/219 CR, 219 D, 219 DC

[56] References Cited

UNITED STATES PATENTS

| | | | |
|---|---|---|---|
| 3,238,501 | 3/1966 | Mak et al. | 235/61.11 E |
| 3,600,593 | 8/1971 | Berler | 235/61.11 E |
| 3,610,891 | 10/1971 | Raciazek | 235/61.11 E |
| 3,621,265 | 11/1971 | Berler | 235/61.11 E |

*Primary Examiner*—Daryl W. Cook
*Attorney*—Arthur J. Plantamura

[57] ABSTRACT

A manual device for reading printed coded documents with the capability of reading by either scanning the device over the printed intelligence contained on the document or by inserting the printed document into a slot formed in the base of the reader. The reader contains no moving parts and comprises essentially a housing with a slot into which a document, usually a conventional merchandise ticket, to be read may be inserted and read. A reading aperture through which printed matter may be read by scanning a document without the necessity of inserting the document into a slot is formed in the base. A photoelectric cell array is used to sense the coded print with the aid of a lens positioned so as to focus the printed information obtained through the aperture in the base onto the photocell array. A light source whose direct light is shielded from the photocells is positioned contiguous to the aperture to shed light on the printed matter to be read.

5 Claims, 6 Drawing Figures

INVENTOR.
ROBERT M. BERLER

BY
Arthur J. Plantamura
ATTORNEY.

INVENTOR.
ROBERT M. BERLER
BY
Arthur J Plantamura
ATTORNEY.

PHOTOELECTRIC MANUAL READER FOR PRINTED CODED TAGS

The present invention is an improvement over the copending application of Robert M. Berler, Ser. No. 21,139 entitled *Hand Held Photo-Optical Reader For Printed Documents* filed on Mar. 19, 1970, which discloses a reader which is designed to read sequentially a plurality of lines on a ticket on which information is printed in columns. In the case of five columns, for example, a simple lens is used to image one line (across the five columns) simultaneously into five corresponding photocells as the reader is passed over the printed information.

The reader described in that application is designed to be moved over a document (which is usually secured) by scanning the reader over the printed information preferably aided in following a straight path movement by a guide which may be an integral part of the ticket itself. The present invention provides a novel reader for printed code which has no moving parts and which, in addition to reading documents by merely stroking the reader over the ticket to be read, is also capable of receiving tickets to be read within a guide slot formed in the base of the reader.

BACKGROUND OF THE INVENTION

One of the more advantageous uses of readers of the kind with which the present invention is concerned resides in its application at the checkout counter, i.e., at the point of sale, in retail stores. To function efficiently at this task, it is desirable that the reader be easily manipulated so that it may be brought into contact with various articles of merchandise, i.e., capable of easily scanning merchandise ticket secured in various ways on articles to be sold, usually at the checkout counter of a store. Accordingly, the invention will be considered in connection with this particular utility; however, it will be understood that the reader may be applied in various other situations.

In most cases, merchandise tickets are attached to merchandise in retail stores to record various useful data such as price, stock or part number, department number, and the like. When customer-selected merchandise is brought to the checkout counter, the clerk refers to the ticket when writing a sales slip. A copy of the slip is retained by the store for later recordation of details of the transaction for accounting and inventory records. This accounting function is usually performed manually, and is tedious, time-consuming and vulnerable to errors of entry. As conventionally performed, these transactions account for a considerable loss of store revenue through lost clerk time, delay in customer service and in errors of collection and recording. Such manual operations also make a current inventory record extremely difficult, if not impossible. The advantages of recording a transaction at the time of, and at the point of, sale by reading directly from the ticket, which contains the pertinent information, are therefore apparent. Such merchandise tags or tickets are secured on the goods in various forms, two of the most common being (1) by a cord fastening the tag to the merchandise, or (2) by pasting, stapling, pinning or otherwise securing the tag on the goods. The device of the present invention offers the distinct advantage of being capable of reading all such tags or tickets irrespective of the manner in which such tickets are secured to the merchandise provided only that access of the reader to the ticket is not obstructed.

SUMMARY OF THE INVENTION

The reading device of this invention comprises a combination of elements including an array of photoelectric sensors, a lens and a light source, none of which are movable within the reader; it is designed to read sequentially, a whole line at one time, a plurality of lines on a printed ticket; preferably a five column printed format is employed. The lens is employed to focus all five columns into five corresponding photocells of the array as the reader is drawn over the columns or as the ticket is drawn past the reader opening. A single de-rated long life lamp illuminates the document. Scanning action of the information printed on the document is accomplished by stroking the reader over the length of the ticket so that the opening formed in the base of the reader is substantially in alignment with the columns of information to be read or by inserting the tag or ticket into the slot formed at the base of the reader. No special means is required to read either tickets which are pasted or otherwise secured to an article, in situ, or tickets which are capable of being fed into the base of the reader. With respect to the former, the reader is merely drawn along the length of the ticket in the scanning action. A reference guide to direct the reader in a straight line is preferably placed on the ticket. Such reference guide may be the edge of one side of the ticket or a preprinted guide line, for example, preferably an abutting guide such as a long slit, an embossed or debossed edge, a fold, and the like may be placed on the ticket to help guide the reader in a straight line as it sweeps over the ticket. Because of its simplicity and relatively large tolerance, the reader can read glued down tickets, even those secured on curved surfaces such as cans of food. It can read tickets of almost any desirable length. With respect to tickets which are attached by string or those which may be detached from merchandise and inserted into the slot formed at the base of the reader, no separate guide is necessary because the slot itself lends sufficient guidance to tickets inserted therein.

OBJECTS OF THE INVENTION

It is an object of the invention to provide an improved photo-optical reader for printed coded documents which is characterized by its versatile usefulness.

It is another object of the invention to provide a hand held printed code reader which is simple in design, inexpensive to manufacture, easy to maintain, it has no moving parts, requires little skill to operate and is especially useful for reading printed merchandise tickets at the point of sale including tickets which may be fed into the reader as well as tickets securely adhered as by glueing to flat as well as curved surfaces.

Additional objects and advantages will be apparent from the description which follows.

DESCRIPTION OF THE PREFERRED EMBODIMENT

The apparatus of the present invention is an optical ticket or card reader which is used to decode printed information by optical means. While the reader of the invention may be adapted to read various types of printed documents, it will be described herein in connection with a printed ticket type format, such as the kind conventionally used on articles of merchandise for retail. The reader has the capability of reading the printed information from tickets of this type whether such tickets are glued flat on the article, in which case the reader is drawn over the top of the ticket, or merely secured thereto, for example, by a string or cord passing through a hole in the ticket, in which case the tickets may be fed as though free into the slot formed in the base of the reader.

Figure 3:
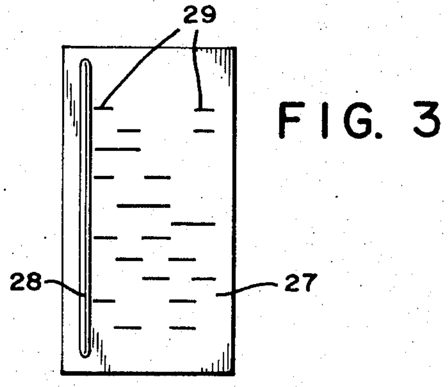
FIG. 3 illustrates one form of coded document which may be read by the device of the invention.
Figures 4, 5:
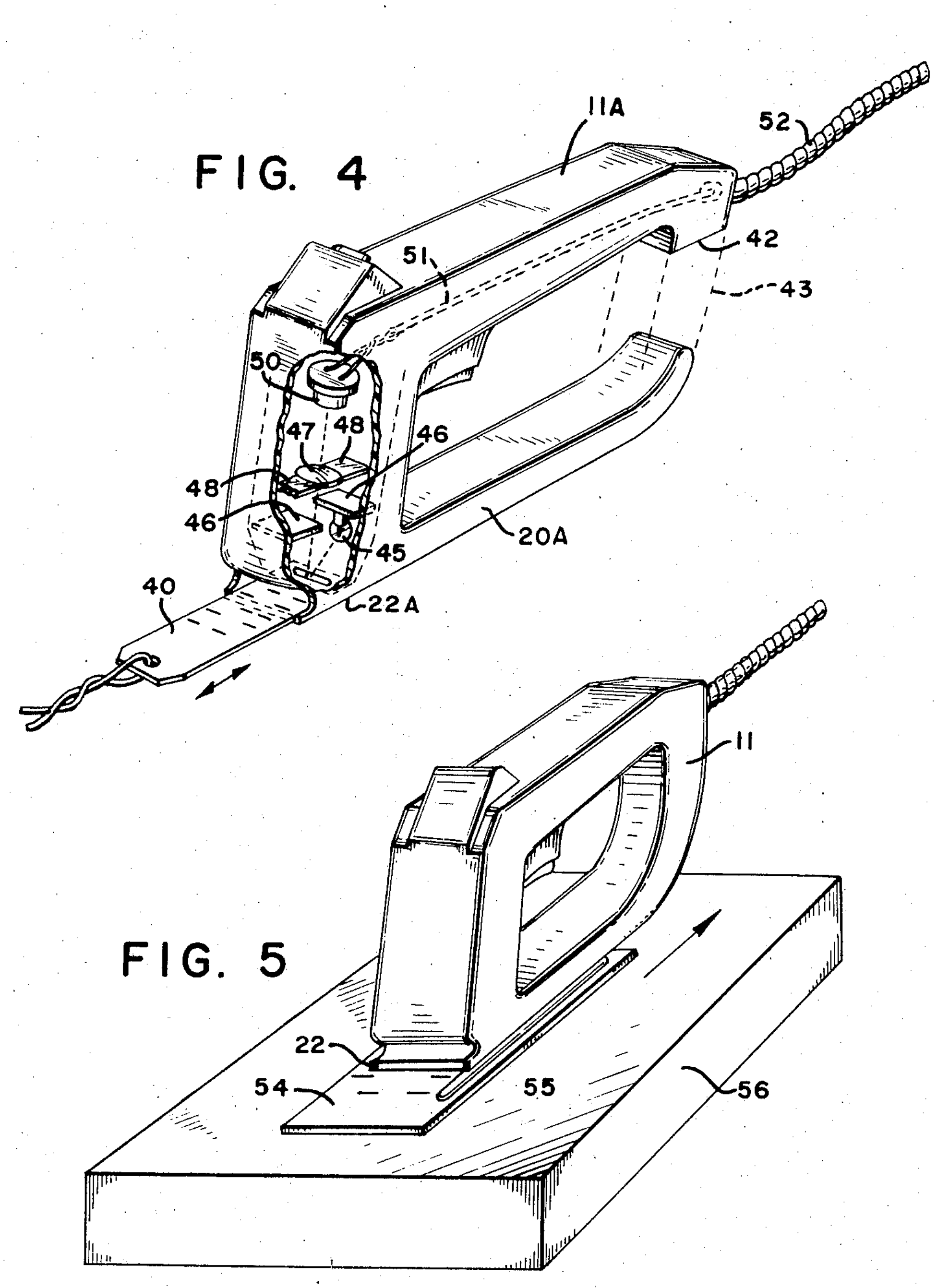
FIG. 4 illustrates a modified form of the reader of the invention in use to decode a ticket which may be fed into the slot formed in the reader base.
FIG. 5 illustrates a use of the device of FIG. 1 to read a ticket which is pasted down where the reading action is effected by scanning the reader over the surface of the ticket.

Reference to FIG. 3 illustrates one type of printed document 27 which may be decoded by the reader of the invention. A guide line 28 is shown running down the left side of the ticket. Where the ticket is of the kind which is glued down, a guide line of this or similar kind is advantageously employed to assist in directing the reader in a straight line during the scanning motion. The guide, of course, is useful only when the ticket is pasted on the article and cannot be fed into the guide slot 26 formed within the reader although the presence of such guide in a ticket which may be fed into the reader is not objectionable. It is to be noted, however, that the presence of a guide such as 28 to help direct the reader in a straight line scan even in tickets which are glued down and cannot be fed bodily into the reader is not critical. In operation, when a guide 28 is used, the reader is positioned in such a way that it is in contact with the ticket just above the top coded line 29 of the five column coded document shown. The left side of the reader skid 22 is place over the guide line 28. The reader is then drawn along so that the left side of the skid 22 as shown in FIG. 5 abuts the guide line as the reader moved from the top to the bottom of the ticket to produce a readout of all lines of the printed coded information.

The guide line 28 on document 27 may take several forms; it is preferably formed as a part of the ticket such as by embossing, grooving, crimping and the like, as described in greater detail in the copending application of Allan Borows, Ser. No. 21,138 filed on Mar. 19, 1970, so as to provide a physical contact against which the reader may abut and thereby hold it in better alignment to minimize chance of error as the reader scans the ticket. A guide of this kind, against which the reader rides, is particularly advantageous in reading a ticket through a plastic transparent wrapping such as a man's shirt, for example, in which the ticket, together with the merchandise, is encased.

Figure 1:
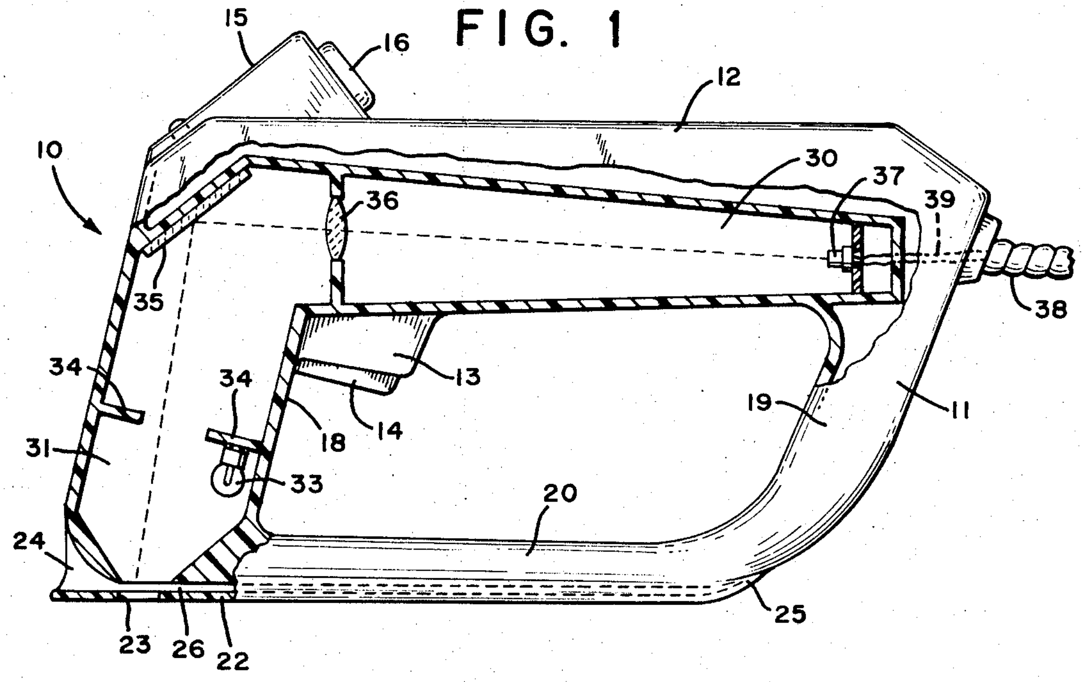
FIG. 1 is a side view partially in section of the hand held reading device illustrating the functional elements housed within the reader.

As shown in FIG. 1, the reader 10 of the invention comprises a lightweight closed-loop housing 11 the top portion 12 of which forms a pistol grip and includes an appropriate switching means such as an index finger switch 14 positioned in housing 13 and/or a thumb switch or rest 16 in housing 15. The handle loop is completed by generally upright left and right housing portions 18 and 19 respectively and a base portion 20. A base or skid plate 22, which has an opening 23 formed therein through which information from a ticket to be read is viewed, is sufficiently spaced from the base 20 so as to receive a ticket within the space 26. The skid 22 is suitably fastened at 24 and contoured at 25 so as to conform smoothly into housing 11. A substantially L-shaped reader module having a horizontal portion 30 and a generally upright vertical portion 31 is incorporated into the housing 11 which comprises the closed loop. A lamp 33, baffles 34, reflecting element 35, lens 36 and photoelectric sensor array 37 are contained in the housing 11 and function so that light from lamp 33 (which is shielded from direct reflection onto reflector 35 illuminates the print on the portion of a ticket to be read. The print is reflected by mirror 35 through lens 36 to the photoelectric sensor array 37. In a reader used to read a five-line ticket as shown, for example, in FIG. 3, the array 37 would contain a bank of five photoelectric cells enabling the reader to decode one full line across the ticket as it is scanned by the reader. The photo sensor array 37, suitably connected to the electrical power cable at 38 through wires 39, is situated in the reader housing loop at the opposite side from the opening 23, i.e., 180° removed from the opening 23. The closed loop arrangement of handle 11 functions to afford substantial stability when the reader is used to decode a document which is glued on a flat surface due to the substantial surface area of horizontal base 32 which extends nearly the whole length of the handle, substantially all of which is in contact with the surface upon which the printed document is secured.

As noted hereinabove, one of the important features of the reader of the present invention resides in its ability to read tickets which may be fed into the reader as well as those which cannot be fed therein but can be merely scanned. With respect to reading the former, the plate or skid 22 of sufficient width (and whose width may include an adjustable feature, not shown) is spaced a sufficient distance from the housing body to accomodate a ticket in the slot or space 26 which is formed between the base 20 of the housing 11 and skid 22. It is thus seen that when so arranged and constructed, the reader of FIG. 1 is capable of reading tickets which are free to be fed into the slot 26 or tickets which are secured to a surface and must be decoded by scanning the reader over the surface of the document to be decoded.

Figure 2:
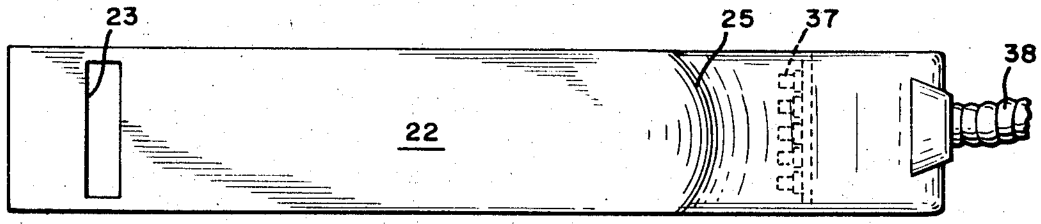
FIG. 2 is a bottom view of the reader of FIG. 1 illustrating the reader opening in the base plate.

In FIG. 4 a ticket 40 is illustrated partially inserted in the process of being read by feeding the ticket into the slot between the base 20A and the skid 22A. In this respect the relationship of base 20A and the skid 22A of FIG. 4 is essentially similar to the base 20 and skid 22 respectively of FIG. 1. The reader housing 11A of the embodiment of FIG. 4 differs from the housing 11 of FIG. 2 in that the housing 11A is illustrated as being open at the rear so as to form essentially a U-shaped configuration although as shown by broken line at 43, the housing may be continuous also to form a closed housing similar to that of FIG. 1. The decoding components of the reader of FIG. 4 may be arranged as shown in FIG. 1, or may be modified from those of FIG. 1 so that the line of sight is direct from the printed image on the ticket 40 being read as shown rather than reflective as provided by the mirror incorporating arrangement of FIG. 1. The reader components of FIG. 4 comprises a light 45 with shielding elements 46 and a lens 47 mounted in a suitable peripheral light masking support 48 so that images from the ticket 40 are directed into the photoelectric sensor 50. The photosensor 50 although illustrated as a single unit is also preferably an array of photoelectric sensors similar to 37 of FIG. 1 and is connected through wiring 51 to a conventional power cable 52. It will be understood that the reader of FIG. 4, as well as the reader of FIG. 1, may be utilized to read either tickets which are fed into the reader or tickets which are secured to a substrate of some kind such as the package 56 as shown in Fig. 5.

In the illustration shown in FIG. 5 a ticket 54 which is glued or otherwise secured on package 56 is read by passing the reader 11 over the coded information printed on the ticket preferably aided by a guide means 55 which may be embossed on the ticket 54.

It will be understood that if the ticket such as that shown as 40 in FIG. 4 is only partially adhered to a substrate such as on the package 56 so that one end of the ticket may be lifted, such ticket may be optionally read either by scanning over it or by lifting the free end of the ticket into the slot in the base and advancing the reader toward the secured end of the ticket.

Figure 6:
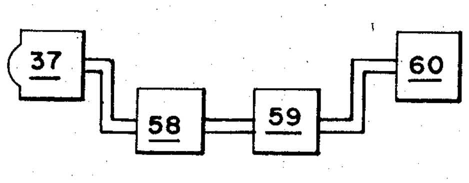
FIG. 6 is a block diagram showing a simple logic circuit useable with the reader of the invention.

FIG. 6 illustrates a simplified schematic arrangement for translating light impulses generated by the printed code on the ticket and imaged onto the photocell array 37. The light impulses received by the photocell array are processed in a conventional manner such as through an amplifier 58 and a decoder 59 to produce the desired electronic signal into a computer 60, for example.

While the invention has been described with reference to a particular embodiment in order to facilitate a full, clear and concise explanation, various modifications apparent to those skilled in the art may be made without departing from the scope and spirit of the invention.

I claim:

1. In a photo-optical reader comprising a housing which is substantially in the form of a loop and comprises a lower horizontal base portion with a document viewing opening formed therein and an upper horizontal hand grip portion and incorporating a light source to illuminate a document to be read through said opening when the reader is positioned in reading relationship to the document and photoelectric detectors to receive through said opening a line of images from the document to be read, the improvement which comprises a base plate spaced from said base portion and substantially in parallel alignment with said base portion and having a viewing window which is in alignment with the opening in said base portion so that images may be viewed optionally (a) through said opening and said window when the reader is placed over a document to be read, and (b) through said opening when a document is inserted between said base portion and base plate.

2. The reader of claim 1 wherein the housing comprises a closed loop and includes a finger switch within said loop.

3. The reader of claim 1 wherein the photoelectric detectors are positioned essentially in vertical alignment with the opening in said base and with said viewing window.

4. The reader of claim 1 wherein the photoelectric detectors are positioned at a point in said housing substantially 180° removed from said opening in the base and a mirror is utilized to reflect said images from said document through a lens to said photoelectric detectors.

5. The reader of claim 1 wherein the photoelectric detectors comprise an array of five detectors each corresponding to one symbol on each line of five columns of printed symbols on the document to be read.

* * * * *

UNITED STATES PATENT OFFICE
CERTIFICATE OF CORRECTION

Patent No. 3,685,723 Dated August 22, 1972

Inventor(s) Robert M. Berler

It is certified that error appears in the above-identified patent and that said Letters Patent are hereby corrected as shown below:

On the cover sheet, insert -- [73] Assignee: Pitney Bowes-Alpex, Inc., Danbury, Conn., a corporation of Delaware -- .

Signed and sealed this 8th day of May 1973.

(SEAL)
Attest:

EDWARD M.FLETCHER,JR.
Attesting Officer

ROBERT GOTTSCHALK
Commissioner of Patents